(12) United States Patent
Alspach et al.

(10) Patent No.: US 11,806,864 B2
(45) Date of Patent: *Nov. 7, 2023

(54) ROBOT ARM ASSEMBLIES INCLUDING FINGERS HAVING DEFORMABLE SENSORS

(71) Applicants: Toyota Research Institute, Inc., Los Altos, CA (US); TOYOTA JIDOSHA KABUSHIKI KAISHA, Toyota (JP)

(72) Inventors: Alexander Alspach, Somerville, MA (US); Naveen Suresh Kuppuswamy, Arlington, MA (US); Avinash Uttamchandani, Cambridge, MA (US); Samson F. Creasey, Cambridge, MA (US); Russell L. Tedrake, Needham, MA (US); Kunimatsu Hashimoto, Brookline, MA (US); Erik C. Sobel, Newton, MA (US); Takuya Ikeda, Nagakute (JP)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,113

(22) Filed: Jan. 18, 2023

(65) Prior Publication Data

US 2023/0150148 A1 May 18, 2023

Related U.S. Application Data

(63) Continuation of application No. 16/909,804, filed on Jun. 23, 2020, now Pat. No. 11,584,026.

(Continued)

(51) Int. Cl.
*B25J 15/12* (2006.01)
*B25J 15/00* (2006.01)

(52) U.S. Cl.
CPC ........... *B25J 15/12* (2013.01); *B25J 15/0033* (2013.01)

(58) Field of Classification Search
CPC .... B25J 15/12; B25J 15/0033; B25J 15/0266; B25J 15/00; B25J 19/02; B26J 13/082
See application file for complete search history.

(56) References Cited

U.S. PATENT DOCUMENTS

| | | |
|---|---|---|
| 4,980,626 A | 12/1990 | Hess et al. |
| 8,260,458 B2 | 9/2012 | Kim et al. |

(Continued)

FOREIGN PATENT DOCUMENTS

KR 20060088769 A 8/2006

OTHER PUBLICATIONS

Extended European Search Report for Application No. 21157677.2-1202, dated Aug. 5, 2021, 5 pages.

(Continued)

*Primary Examiner* — Stephen A Vu
(74) *Attorney, Agent, or Firm* — Dinsmore & Shohl LLP

(57) ABSTRACT

A robot arm assembly for detecting a pose and force associated with an object is provided. The robot arm assembly includes an end effector having a plurality of fingers, and a deformable sensor provided on each finger. The deformable sensor includes a housing, a deformable membrane coupled to the housing, an enclosure filled with a medium, and an internal sensor disposed within the housing having a field of view directed through the medium and toward an internal surface of the deformable membrane. A processor is configured to receive an output from each internal sensor, the output including a contact region of the deformable membrane as a result of contact with the object. The processor determines an amount of displacement of the contact region based on the output from each internal sensor, (Continued)

and determines the pose and the force associated with the object based on the amount of displacement.

20 Claims, 12 Drawing Sheets

Related U.S. Application Data

(60) Provisional application No. 62/984,083, filed on Mar. 2, 2020, provisional application No. 62/977,468, filed on Feb. 17, 2020.

(56) References Cited

U.S. PATENT DOCUMENTS

| | | | |
|---|---|---|---|
| 8,286,509 | B2 | 10/2012 | Igarashi et al. |
| 9,120,230 | B2 | 9/2015 | Lipson et al. |
| 9,333,648 | B2 | 5/2016 | Kim et al. |
| 9,605,952 | B2 | 3/2017 | Rose et al. |
| 9,605,962 | B2 | 3/2017 | Jordil |
| 9,802,314 | B2 | 10/2017 | Yamane et al. |
| 10,668,627 | B2 * | 6/2020 | Alspach ............... G01B 11/16 |
| 11,584,026 | B2 * | 2/2023 | Alspach ............... B25J 15/0033 |
| 2012/0240691 | A1 | 9/2012 | Wettels et al. |
| 2017/0239821 | A1 | 8/2017 | Lessing et al. |
| 2019/0091871 | A1 | 3/2019 | Alspach et al. |
| 2019/0171004 | A1 | 6/2019 | Bretagnol et al. |

OTHER PUBLICATIONS

Claudius Strub T., Florentin Worgottert, Helge Ritter and Yulia Sandamirskaya: Correcting pose estimates during tactile exploration of object shape: a neuro-robotic study, 4th International Conference On Development and Learning and On Epigenetic Robotics, IEEE, Oct. 13, 2014 (Oct. 13, 2014), pp. 26-33, XP032702771, DOI: 10.1109/DEVLRN.2014.6982950, 8 pages.

Rui Li, Robert Platt Jr., Wenzhen Yuan, Andreas Ten Pas, Nathan Roscup, Mandayam A. Srinivasan, and Edward Adelson: Localization and manipulation of small parts using GelSight tactile sensing, 2014 IEEE/RSJ International Conference On Intelligent Robots and Systems, IEEE, Sep. 14, 2014 (Sep. 14, 2014), pp. 3988-3993, XP032676947, DOI: 10.1109/IROS.2014.6943123, 6 pages.

Direction of slip detection for adaptive grasp force control with a dexterous robotic hand (https://www.syntouchinc.com/wpcontent/uploads/2018/09/Direction-of-Slip-Detection-for-Adaptive-Grasp-Force-Control-with-aDexterous-Robotic-(Hand.pdf), Proceedings of the 2018 IEEE/ASME International, Conference on Advanced Intelligent Mechatronics (AIM), Auckland, New Zealand, Jul. 9-12, 2018, 7 pages.

Soft-bubble: A highly compliant dense geometry tactile sensor for robot manipulation (https://arxiv.org/ftp/arxiv/papers/1904/1904.02252.pdf), 8 pages.

The Performance of a Deformable-Membrane Tactile Sensor: Basic Results on Geometrically-Defined Tasks (https://apps.dtic.mil/dtic/tr/fulltext/u2/a439988.pdf), 8 pages.

* cited by examiner

ROBOT ARM ASSEMBLIES INCLUDING FINGERS HAVING DEFORMABLE SENSORS

CROSS-REFERENCE TO RELATED APPLICATIONS

This application is a continuation of U.S. patent application Ser. No. 16/909,804, filed on Jun. 23, 2020, for "Robot Arm Assemblies Including Fingers Having Deformable Sensors," and claims priority to U.S. Provisional Patent Application No. 62/977,468, filed Feb. 17, 2020, for "Robot Arm Assemblies Including Fingers Having A Bubble Sensor," and U.S. Provisional Patent Application No. 62/984,083, filed on Mar. 2, 2020, for "Bubble Sensor Grippers For Robust Manipulation And Manipuland State Estimation," which are hereby incorporated by reference in their entirety including the drawings.

TECHNICAL FIELD

Embodiments described herein generally relate to robot arms having contact sensors and, more particularly, to robot arms having deformable contact and geometry/pose sensors on fingers of the robot arms capable of detecting contact and a geometry of an object.

BACKGROUND

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object. As such, in some applications, a deformable/compliant end effector may be desirable.

SUMMARY

In one embodiment, a robot arm assembly for detecting a pose and force associated with an object includes a robot arm including an end effector having a plurality of fingers, and a deformable sensor provided on each of the plurality of fingers. The deformable sensor includes a housing, a deformable membrane coupled to the housing, and an enclosure partially defined by the deformable membrane. The enclosure is configured to be filled with a medium. The deformable sensor also includes an internal sensor disposed within the housing. The internal sensor has a field of view directed through the medium and toward an internal surface of the deformable membrane. The robot arm assembly includes one or more processors communicatively coupled to each internal sensor and one or more memory modules including a computer-readable medium storing computer-readable instructions that, when executed by the one or more processors, cause the one or more processors to receive an output from each internal sensor, the output including a contact region of the deformable membrane as a result of contact with the object, determine an amount of displacement of the contact region of the deformable membrane based on the output from each internal sensor, and determine the pose and the force associated with the object based on the amount of displacement of the contact region of the deformable membrane.

In another embodiment, a method for sensor-based detection of an object includes operating a robot arm including an end effector having a plurality of fingers to cause at least some of the plurality of fingers to contact the object, each of the plurality of fingers including a deformable sensor. An internal sensor disposed within the deformable sensor is utilized having a field of view directed through a medium and toward an internal surface of a deformable membrane of the deformable sensor. A processor communicatively coupled to each internal sensor receives an output from the internal sensor, the output including a contact region of the deformable membrane as a result of contact with the object. The processor determines an amount of displacement of the contact region of the deformable membrane based on the output from each internal sensor. The processor determines a pose and a force associated with the object based on the amount of displacement of the contact region of the deformable membrane.

In yet another embodiment, a system for detecting a pose and force associated with an object includes a robot arm including an end effector having a plurality of fingers, and a deformable sensor provided on at least two of the plurality of fingers. The deformable sensor includes a housing, a deformable membrane coupled to the housing, the deformable membrane having a patterned internal surface facing the housing, an enclosure partially defined by the deformable membrane, and a fluid conduit extending through the housing and into the enclosure to fill the enclosure with a medium. The system also includes an internal sensor disposed within the housing. The internal sensor has a field of view directed through the medium and toward an internal surface of the deformable membrane. The internal sensor is configured to detect a contact region of the deformable membrane as a result of contact with the object. The end effector is movable between an open position and a closed position in which a distance between the plurality of fingers when the end effector in the closed position is less than a distance between the plurality of fingers when the end effector is in the open position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to robot arms including a plurality of fingers, each finger including at least one deformable/compliant contact and/or geometry sensor (hereinafter "deformable sensors") that detects contact with a target object and detects the geometry, pose, and contact force of the target object. Particularly, the deformable sensors described herein include a deformable membrane coupled to a housing that maintains a sensor capable of detecting displacement of the deformable membrane by contact with an object. Thus, the deformable sensors described herein provide a robot (or other device) with a sense of touch when manipulating objects.

Figure 1:
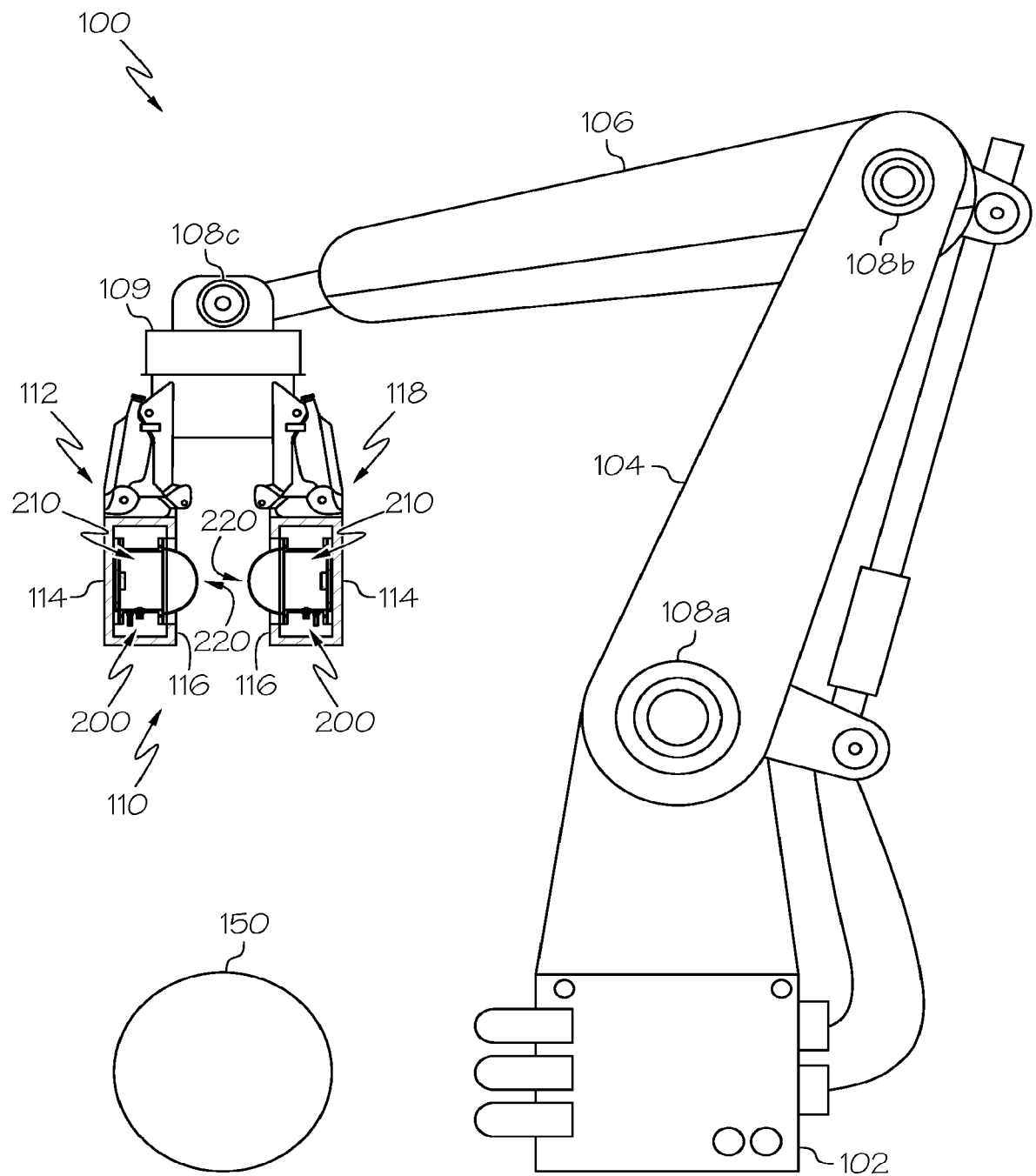
FIG. 1 schematically depicts an example robot arm including an end effector having a plurality of fingers and an example deformable sensor on each finger according to one or more embodiments described and illustrated herein.
Figure 2A:
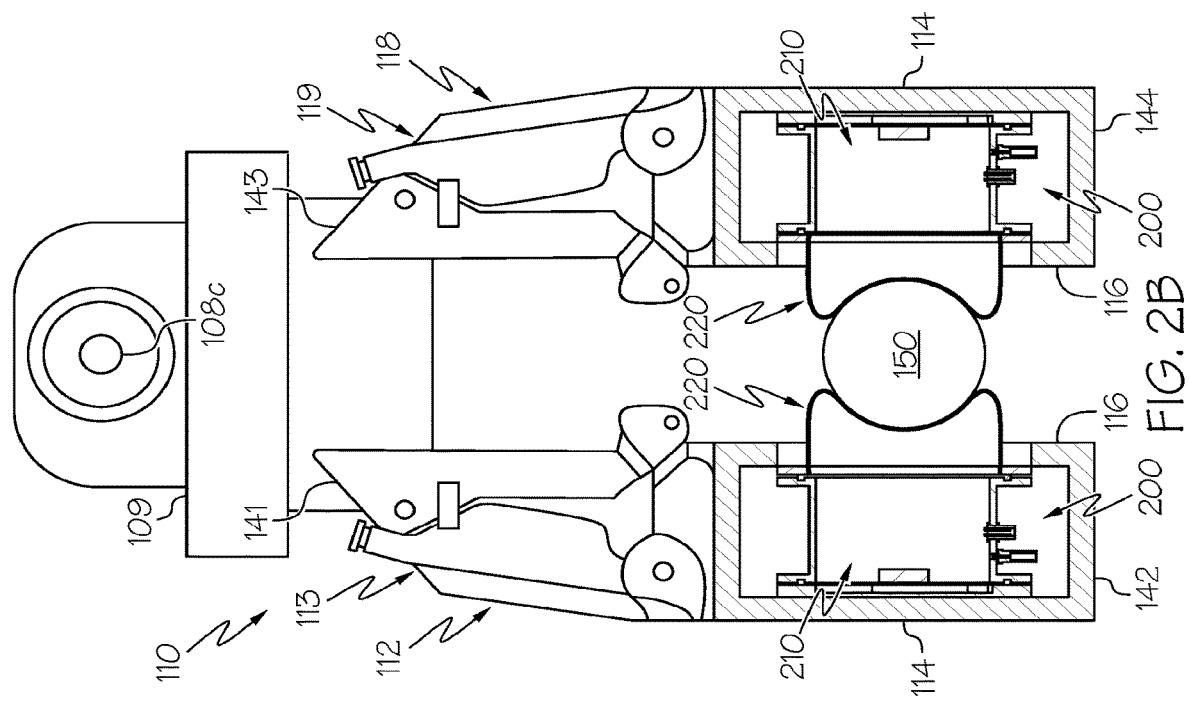
FIG. 2A schematically depicts an enlarged view of the end effector when not grasping a target object according to one or more embodiments described and illustrated herein.
Figure 2B:
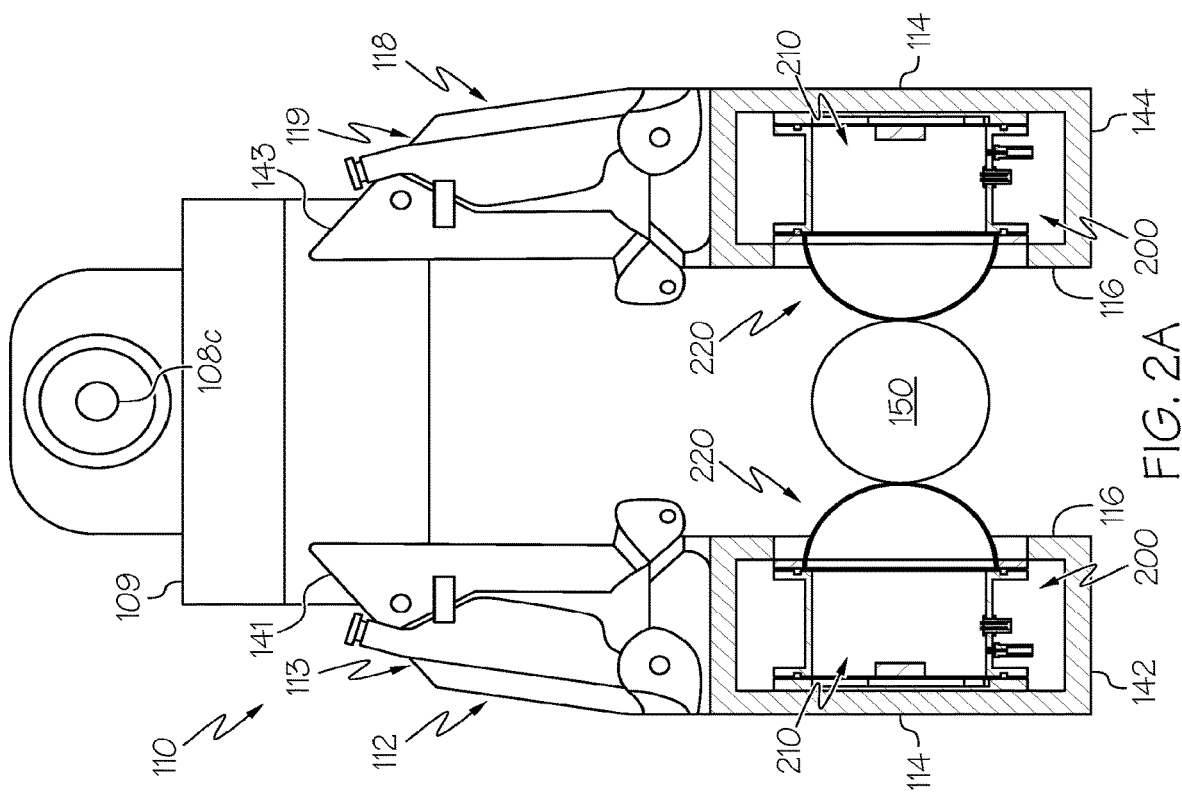
FIG. 2B schematically depicts an enlarged view of the end effector when grasping a target object according to one or more embodiments described and illustrated herein.

Referring now to FIGS. 1, 2A, and 2B, an illustrative robot arm 100 having an end effector 110 for manipulating a target object 150 is depicted. The robot arm 100 may provide particular use in pick-and-drop applications, such as, for example, a bin picking application. However, it should be appreciated that the robot arm 100 is not limited to this use and may be used for other purposes without departing from the scope of the present disclosure. In some embodiments, the robot arm 100 may be used in the healthcare industry, the manufacturing industry, the vehicle repair industry, and/or the like.

The robot arm 100 may generally include a base 102 coupled to one or more arm segments (e.g., a first arm segment 104 and/or a second arm segment 106) via one or more joints 108a, 108b, 108c, thereby providing the robot arm 100 with a wide range of motion. As robot arms for pick-and-drop applications are generally understood, the robot arm 100 depicted in FIGS. 1, 2A, and 2B is now described in further detail herein.

In some embodiments, the end effector 110 may include two or more fingers, such as a first finger 112 and a second finger 118. The first finger and the second finger are attached to joint 108c via a coupling member 109. While the robot arm 100 illustrated herein only depicts two fingers, the present disclosure is not limited to such. That is, the end effector 110 may have three fingers, four fingers, or more than four fingers without departing from the scope of the present disclosure. In some embodiments, the end effector 110 may include five fingers and be formed to provide an appearance similar to that of a human hand. The two or more fingers 112, 118 may be movable with respect to one another to open and close the end effector 110 for picking up the target object 150. For example, the two or more fingers 112, 118 may be movable by a controller between an open position (FIG. 2A) whereby the target object 150 is not held by the two or more fingers 112, 118 and a closed position (FIG. 2B) whereby the target object 150 is held by the two or more fingers 112, 118. The two or more fingers 112, 118 may move between the open position and the closed position by translating or pivoting relative to the coupling member 109. When the end effector 110 includes more than two fingers, it may not be necessary for each finger 112, 118 to operate to grasp the target object 150. Instead, it may only be necessary for a subset of the fingers 112, 118 to be operated, such as two of the fingers 112, 118 to pinch the target object 150.

The first finger 112 and the second finger 118 each include a deformable sensor 200. Each deformable sensor 200 generally includes a housing 210 and a deformable membrane 220. As described in more detail herein, the deformable membrane 220 deforms upon contact with the target object 150 as the first finger 112 and/or the second finger 118 are moved toward the closed position. As used herein, deformability may refer, for example, to ease of deformation of deformable sensors. Deformability may also refer to how easily a deformable membrane deforms when contacting a target object. A deformable sensor may be of a high spatial resolution, with a dense tactile sensing sensor that is provided at an end effector of a robot, such as the robot arm 100, thereby giving the robot a fine sense of touch like a human's fingers. A deformable sensor may also have a depth resolution to measure movement toward and away from the sensor.

Referring to FIGS. 2A and 2B, additional details regarding the two or more fingers 112, 118 of the end effector 110 are depicted. For example, the first finger 112 may include a proximal end 141 and a distal end 142. A grip mechanism 113 causes the first finger 112 to pivot with respect to the end effector 110 and the distal end 142 to move inwardly toward the second finger 118 when the end effector 110 is placed in the closed position (as depicted in FIG. 2B) and outwardly away from the second finger 118 when the end effector 110 is placed in the open position (as depicted in FIG. 2A). In addition, the second finger 118 may include a proximal end 143 and a distal end 144. A grip mechanism 119 causes the second finger 118 to pivot with respect to the end effector 110 and the distal end 144 to move inwardly toward the first finger 112 when the end effector 110 is placed in the closed position (as depicted in FIG. 2B) and outwardly away from the first finger 112 when the end effector 110 is placed in the open position (as depicted in FIG. 2A).

Referring to FIG. 2A, each of the first finger 112 and the second finger 118 may have an external side member 114 and an internal side member 116. The external side member 114 of the first finger 112 and the second finger 118 may generally be outwardly facing (e.g., the external side member 114 of the first finger 112 faces away from the second finger 118 and the external side member 114 of the second finger 118 faces away from the first finger 112). The internal side member 116 of the first finger 112 and the second finger 118 may generally be inwardly facing (e.g., the internal side member 116 of the first finger 112 faces toward the second finger 118 and the internal side member 116 of the second finger 118 faces toward the first finger 112).

The deformable membrane 220 of the deformable sensor 200 is inwardly facing (e.g., the deformable membrane 220 of the deformable sensor 200 on the first finger 112 faces toward the second finger 118 and the deformable membrane 220 of the deformable sensor 200 on the second finger 118 faces toward the first finger 112). In some embodiments, as shown, the housing 210 of the deformable sensor 200 on the first finger 112 may be at least partially housed within the first finger 112 between the internal side member 116 and the external side member 114. However, the deformable membrane 220 of the deformable sensor 200 on the first finger 112 extends past or through the internal side member 116 such that the deformable membrane 220 may contact the target object 150. Alternatively, in some embodiments, the housing 210 of the deformable sensor 200 on the first finger 112 may be provided on the internal side member 116 such that the entire deformable sensor 200 is exteriorly positioned on the first finger 112.

Similarly, in some embodiments, the housing 210 of the deformable sensor 200 on the second finger 118 may be at least partially housed within the second finger 118 between the internal side member 116 and the external side member 114. However, the deformable membrane 220 of the deformable sensor 200 on the second finger 118 extends past or through the internal side member 116 such that the deformable membrane 220 may contact the target object 150. Alternatively, the housing 210 of the deformable sensor 200 on the second finger 118 may be provided on the internal side member 116 such that the entire deformable sensor 200 is exteriorly positioned on the second finger 118.

It should be appreciated that the deformable nature of the deformable membrane 220 of each deformable sensor 200, along with the grip mechanism 113 of the first finger 112 and the grip mechanism 119 of the second finger 118, allow for the first finger 112 and the second finger 118 to conform around the target object 150 when the end effector 110 grips the target object 150, as depicted in FIG. 2B. As a result of this grip, one or more points on each of the deformable membranes 220 contact the target object 150 resulting in a specific deformation in the deformable membranes 220 corresponding to a geometry and/or pose of the target object 150. In embodiments where the target object 150 is not circular shaped (e.g., has an irregular shape), the point(s) of contact between the deformable membranes 220 and the target object 150 may cause the deformable membrane 220 of the first finger 112 to have a deformation different from the deformable membrane 220 of the second finger 118. Regardless of the shape of the target object 150, when the first finger 112 and the second finger 118 are brought toward each other toward the closed position around the target object 150, the deformable nature of the deformable membrane 220 on each of the first finger 112 and the second finger 118 generally allows the first finger 112 and the second finger 118 to conform to the shape of the target object 150 so as to maintain a secure grasp of the target object 150 and more successfully hold the target object 150 in place as opposed to robotic end effectors that do not include a deformable sensor.

In some embodiments, the first finger 112 and the second finger 118 cooperate to manipulate the target object 150 based on data provided by each of the first finger 112 and the second finger 118. For example, the first finger 112 and the second finger 118 may each transmit data, including contact force data of the respective finger on the target object 150, to a computing device. The computing device may then operate the first finger 112 and/or the second finger 118 to ensure that the force applied by each of the fingers 112, 118 on the target object 150 is equal or substantially equal so as to not mishandle the target object 150. For instance, if the contact force of the first finger 112 on the target object 150 is significantly greater than the contact force of the second finger 118 on the target object 150, the target object 150 may tip over or be inadvertently pushed. Further, if the first finger 112 contacts the target object 150 prior to the second finger 118 contacting the target object 150, the target object 150 may also be pushed. Thus, the computing device may restrict operation of either or both of the first finger 112 and the second finger 118 so that the target object 150 is properly handled.

It should also be appreciated that each finger, such as the first finger 112 and the second finger 118, may each include a plurality of deformable sensors 200 extending along or through the internal side member 116 thereof instead of a singular deformable sensor 200. Providing a plurality of deformable sensors 200 on each finger 112, 118 allows for a greater number of deformations to be identified along the target object 150 and to provide more accurate determinations of the geometry and/or pose of the target object 150.

Figure 3:
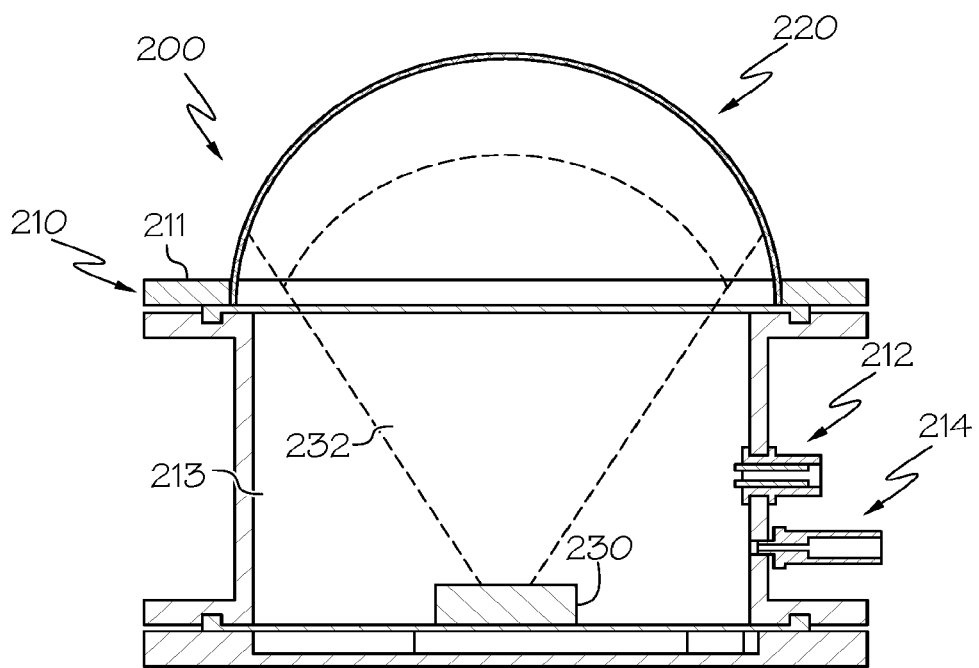
FIG. 3 schematically depicts a cross-sectional view of the example deformable sensor of the robot arm of FIG. 1 according to one or more embodiments described and illustrated herein.
Figure 4:
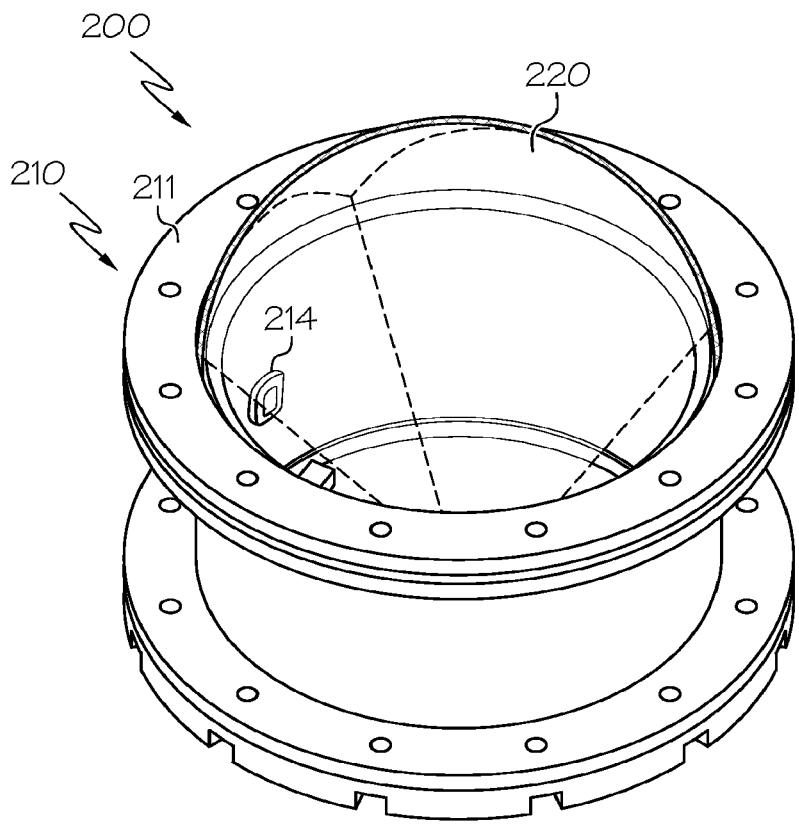
FIG. 4 schematically depicts a top perspective view of the example deformable sensor of FIG. 3 according to one or more embodiments described and illustrated herein.

Referring now to FIGS. 3 and 4, the deformable sensor 200 is schematically illustrated. FIG. 3 is a cross-sectional view of the deformable sensor 200 and FIG. 4 is a top perspective view of the deformable sensor 200. The deformable sensor 200 generally comprises the housing 210 and the deformable membrane 220 coupled to the housing 210, such as by an upper portion 211 of the housing 210. In some embodiments, the housing 210 is 3D printed. The housing 210 and the deformable membrane 220 define an enclosure 213 that is filled with a medium through one or more fluid conduits 212, which may be a valve or any other suitable mechanism. The fluid conduit 212 may be utilized to fill or empty the enclosure 213. In one example, the medium is gas, such as air. Thus, air may be pumped into the enclosure 213 to a desired pressure such that the deformable membrane 220 forms a dome shape as shown in FIG. 3, although any suitable shape may be utilized in other embodiments. In another example, the medium is a gel, such as silicone or other rubber-like substance. In some embodiments, a substance such as solid silicone may be cast in a given shape before assembly of the deformable sensor 200. In various embodiments, the medium may be anything that is transparent to an internal sensor, discussed in more detail below, such as to a wavelength of a time-of-flight sensor. The medium may include clear/transparent rubbers in some embodiments. In other embodiments, the medium may be a liquid. In some examples, the deformable membrane 220 and the medium within the enclosure 213 may be fabricated of the same material, such as, without limitation, silicone. In some embodiments, the deformable sensor 200 may be mountable. For example, the enclosure 213 may include brackets to be mounted to any suitable object, such as the first finger 112 and the second finger 118 described herein. The deformable membrane 220 may be a latex or any other suitable material, such as a suitably thin, non-porous, rubber-like material. In some embodiments, the deformable membrane 220 is laser-cut from a 0.04 mm thick latex sheet.

The deformability of the deformable sensor 200 may be tuned/modified by changing the material of the deformable membrane 220 and/or the pressure within the enclosure 213. By using a softer material (e.g., soft silicone), the deformable sensor 200 may be more easily deformed. Similarly, lowering the pressure within the enclosure 213 may also cause the deformable membrane 220 to more easily deform, which may in turn provide for a more deformable sensor 200. In some embodiments, the deformable membrane 220 is inflated to a height of 20 mm to 75 mm and to a pressure of 0.20 psi to 0.30 psi. In some embodiments, the deformable sensor 200 features varying touch sensitivity due to varying spatial resolution and/or depth resolution. As used herein, spatial resolution may refer, for example, to how many pixels a deformable sensor has. The number of pixels may range from 1 (e.g., a sensor that simply detects contact with a target object) to thousands or millions (e.g., a dense tactile sensor provided by a time-of-flight sensor having thousands of pixels) or any suitable number.

An internal sensor 230 capable of sensing depth may be disposed within the enclosure 213. The internal sensor 230 may have a field of view 232 directed through the medium and toward an internal surface of the deformable membrane 220. In some embodiments, the field of view 232 of the internal sensor 230 may be 62°×45°+/−10%. In some embodiments, the internal sensor 230 may be an optical sensor. As described in more detail below, the internal sensor 230 may be capable of detecting deflections of the deformable membrane 220 when the deformable membrane 220 comes into contact with the target object 150. In one example, the internal sensor 230 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 230 may be changed. In some cases, low spatial resolution (e.g., one "pixel" that detects a single point's displacement) may be desired. In others, a sensitive time-of-flight sensor such may be used as a high spatial resolution internal sensor 230 that provides dense tactile sensing. Thus, the internal sensor 230 may be modular because the sensors may be changed depending on the application.

A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3D scanners, single cameras (such as with dots or other patterns inside), or any other suitable type of visual detector. For example, the internal sensor 230 may be configured as a stereo-camera capable of detecting deflections of the deformable membrane 220 by the target object 150.

Any suitable quantity and/or types of internal sensors 230 may be utilized within a single deformable sensor 200 in some embodiments. In some examples, not all internal sensors 230 within the deformable sensor 200 need be of the same type. In various embodiments, one deformable sensor 200 may utilize a single internal sensor 230 with a high spatial resolution, whereas another deformable sensor 200 may use a plurality of internal sensors 230 that each have a low spatial resolution. In some embodiments, the spatial resolution of a deformable sensor 200 may be increased due to an increase in the quantity of internal sensors 230. In some examples, a decrease in the number of internal sensors 230 within a deformable sensor 200 can be compensated for by a corresponding increase in the spatial resolution of at least some of the remaining internal sensors 230. The aggregate deformation resolution may be measured as a function of the deformation resolution or depth resolution among the deformable sensors 200 on a portion of the robot arm 100. In some embodiments, aggregate deformation resolution may be based upon a quantity of deformable sensors 200 on a portion of the robot arm 100 and a deformation resolution obtained from each deformable sensor 200 in that portion.

Referring again to FIG. 3, a power conduit 214 may be utilized in the enclosure 213 to provide power and/or data/signals, such as to the internal sensor 230 by way of a cable, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through with an airtight seal, such as an O-ring, being formed around such wires/cables at each end of the airtight conduit. Other embodiments utilize wireless internal sensors 230 to transmit and/or receive data and/or power. In various embodiments where the medium is not a gas, such as silicone, the enclosure 213 and/or the power conduit 214 may not necessarily be airtight.

In some embodiments, the internal sensor 230 may include one or more internal pressure sensors (barometers, pressure sensors, etc., or any combination thereof) utilized to detect the general deformation of the deformable membrane 220 through the medium. In some embodiments, the deformable sensor 200 and/or internal sensor 230 may receive/send various data, such as through the power conduit 214 discussed above, wireless data transmission (Wi-Fi, Bluetooth, etc.), or any other suitable data communication protocol. For example, pressure within the deformable sensor 200 may be specified by a pressurization parameter and may be inversely proportional to the deformability of the deformable sensor 200. In some embodiments, the deformability of a deformable sensor 200 may be modified by changing pressure within the enclosure 213 or a material of the deformable membrane 220. In some embodiments, receipt of an updated parameter value may result in a real-time or delayed update (pressurization, etc.).

Figure 5:
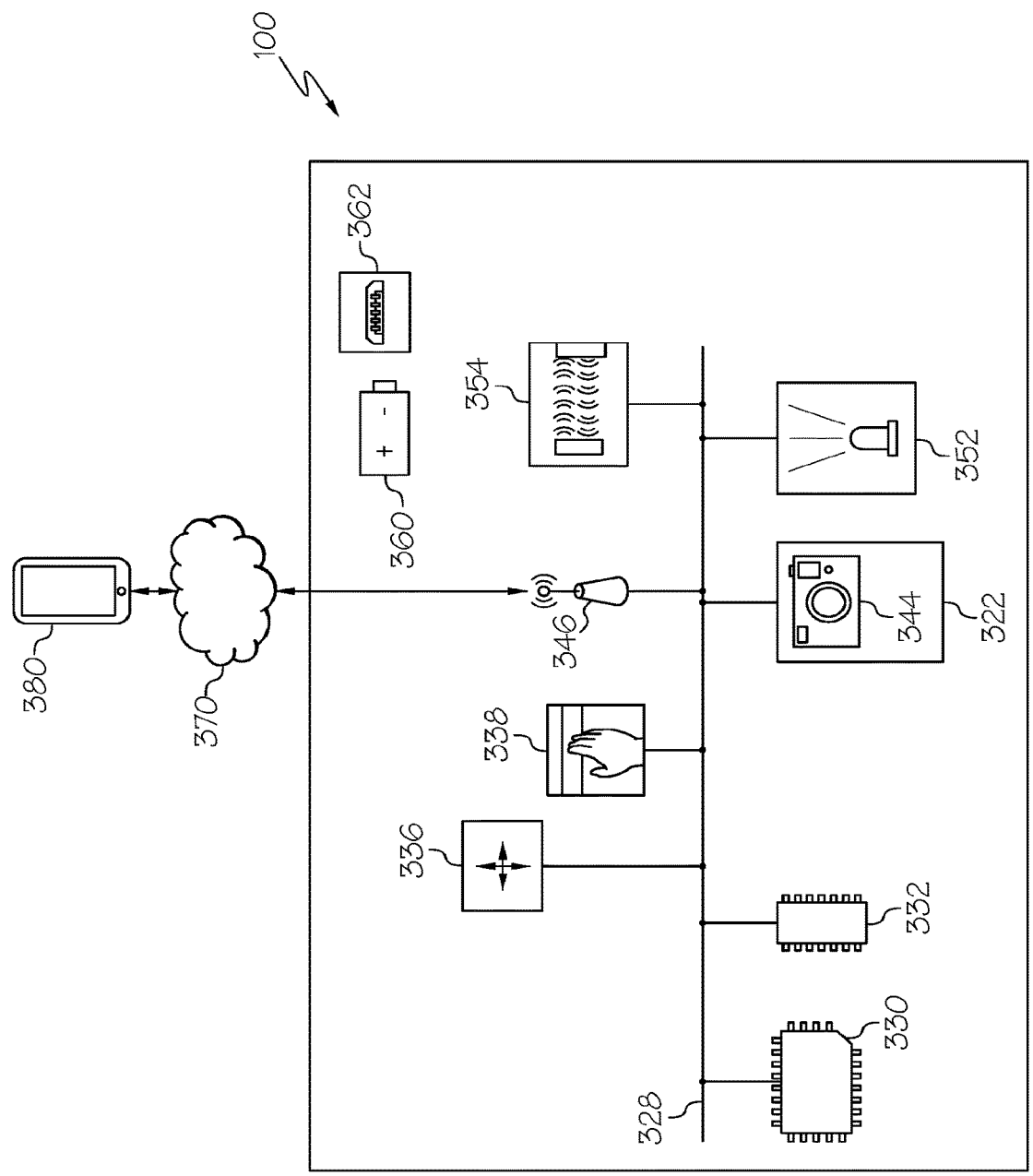
FIG. 5 is a block diagram illustrating hardware utilized in the example robot arm of FIG. 1 for implementing various processes and systems, according one or more embodiments described and illustrated herein.

Turning now to FIG. 5, example components of one non-limiting embodiment of the robot arm 100 is schematically depicted. The robot arm 100 includes a communication path 328, a processor 330, a memory module 332, an inertial measurement unit 336, an input device 338, a camera 344, network interface hardware 346, a light 352, a proximity sensor 354, a battery 360, and a charging port 362. The components of the robot arm 100 may be contained within or mounted to the robot arm 100. The various components of the robot arm 100 and the interaction thereof will be described in detail below.

Still referring to FIG. 5, the communication path 328 may be formed from any medium that is capable of transmitting a signal such as, for example, conductive wires, conductive traces, optical waveguides, or the like. Moreover, the communication path 328 may be formed from a combination of mediums capable of transmitting signals. In one embodiment, the communication path 328 comprises a combination of conductive traces, conductive wires, connectors, and buses that cooperate to permit the transmission of electrical data signals to components such as processors, memories, sensors, input devices, output devices, and communication devices. Accordingly, the communication path 328 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 328 communicatively couples the various components of the robot arm 100. As used herein, the term "communicatively coupled" means that coupled components are capable of exchanging data signals with one another such as, for example, electrical signals via conductive medium, electromagnetic signals via air, optical signals via optical waveguides, and the like.

The processor 330 of the robot arm 100 may be any device capable of executing computer-readable instructions. Accordingly, the processor 330 may be a controller, an integrated circuit, a microchip, a computer, or any other computing device. The processor 330 may be communicatively coupled to the other components of the robot arm 100 by the communication path 328. This may, in various embodiments, allow the processor 330 to receive data from the one or more deformable sensors 200. In other embodiments, the processor 330 may receive data directly from one or more internal sensors 230 which are part of one or more deformable sensors 200 on the robot arm 100. Accordingly, the communication path 328 may communicatively couple any number of processors with one another, and allow the components coupled to the communication path 328 to operate in a distributed computing environment. Specifically, each of the components may operate as a node that may send and/or receive data. While the embodiment depicted in FIG. 5 includes a single processor 330, other embodiments may include more than one processor.

Still referring to FIG. 5, the memory module 332 of the robot arm 100 is coupled to the communication path 328 and communicatively coupled to the processor 330. The memory module 332 may, for example, contain instructions to detect a shape of the target object 150 that has deformed the deformable sensors 200. In this example, these instructions stored in the memory module 332, when executed by the processor 330, may allow for the determination of the shape of the target object 150 based on the observed deformation of the deformable sensors 200. The memory module 332 may comprise RAM, ROM, flash memories, hard drives, or any non-transitory memory device capable of storing computer-readable instructions such that the computer-readable instructions can be accessed and executed by the processor 330. The computer-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer-readable instructions and stored in the memory module 332. Alternatively, the computer-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 5 includes a single memory module 332, other embodiments may include more than one memory module.

The inertial measurement unit 336, if provided, is coupled to the communication path 328 and communicatively coupled to the processor 330. The inertial measurement unit 336 may include one or more accelerometers and one or more gyroscopes. The inertial measurement unit 336 transforms sensed physical movement of the robot arm 100 into a signal indicative of an orientation, a rotation, a velocity, or an acceleration of the robot arm 100. The operation of the robot arm 100 may depend on an orientation of the robot arm 100 (e.g., whether the robot arm 100 is horizontal, tilted, or the like). Some embodiments of the robot arm 100 may not include the inertial measurement unit 336, such as embodiments that include an accelerometer, but not a gyroscope, embodiments that include a gyroscope but not an accelerometer, or embodiments that include neither an accelerometer nor a gyroscope.

One or more input devices 338 are coupled to the communication path 328 and communicatively coupled to the processor 330. The input device 338 may be any device capable of transforming user contact into a data signal that can be transmitted over the communication path 328 such as, for example, a button, a switch, a knob, a microphone, or the like. In various embodiments, an input device 338 may be the deformable sensor 200 as described herein. In some embodiments, the input device 338 includes a power button, a volume button, an activation button, a scroll button, or the like. The one or more input devices 338 may be provided so that the user may interact with the robot arm 100, such as to navigate menus, make selections, set preferences, and other functionality described herein. In some embodiments, the input device 338 includes a pressure sensor, a touch-sensitive region, a pressure strip, or the like. It should be understood that some embodiments may not include the input device 338. As described in more detail below, embodiments of the robot arm 100 may include multiple input devices disposed on any surface of the robot arm 100. In some embodiments, one or more of the input devices 338 are configured as a fingerprint sensor for unlocking the robot arm 100. For example, only a user with a registered fingerprint may unlock and use the robot arm 100.

The camera 344 is coupled to the communication path 328 and communicatively coupled to the processor 330. The camera 344 may be any device having an array of sensing devices (e.g., pixels) capable of detecting radiation in an ultraviolet wavelength band, a visible light wavelength band, or an infrared wavelength band. The camera 344 may have any resolution. The camera 344 may be an omni-directional camera, or a panoramic camera. In some embodiments, one or more optical components, such as a mirror, fish-eye lens, or any other type of lens may be optically coupled to the camera 344. As described in more detail below, the camera 344 is a component of an imaging assembly 322 operable to be raised to capture image data.

The network interface hardware 346 is coupled to the communication path 328 and communicatively coupled to the processor 330. The network interface hardware 346 may be any device capable of transmitting and/or receiving data via a network 370. Accordingly, network interface hardware 346 can include a wireless communication module configured as a communication transceiver for sending and/or receiving any wired or wireless communication. For example, the network interface hardware 346 may include an antenna, a modem, LAN port, Wi-Fi card, WiMax card, mobile communications hardware, near-field communication hardware, satellite communication hardware, and/or any wired or wireless hardware for communicating with other networks and/or devices. In one embodiment, network interface hardware 346 includes hardware configured to operate in accordance with the Bluetooth wireless communication protocol. In another embodiment, network interface hardware 346 may include a Bluetooth send/receive module for sending and receiving Bluetooth communications to/from a portable electronic device 380. The network interface hardware 346 may also include a radio frequency identification ("RFID") reader configured to interrogate and read RFID tags.

In some embodiments, the robot arm 100 may be communicatively coupled to the portable electronic device 380 via the network 370. In some embodiments, the network 370 is a personal area network that utilizes Bluetooth technology to communicatively couple the robot arm 100 and the portable electronic device 380. In other embodiments, the network 370 may include one or more computer networks (e.g., a personal area network, a local area network, or a wide area network), cellular networks, satellite networks and/or a global positioning system and combinations thereof. Accordingly, the robot arm 100 can be communicatively coupled to the network 370 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 370 may be utilized to communicatively couple the robot arm 100 with the portable electronic device 380. The portable electronic device 380 may include a mobile phone, a smartphone, a personal digital assistant, a camera, a dedicated mobile media player, a mobile personal computer, a laptop computer, and/or any other portable electronic device capable of being communicatively coupled with the robot arm 100. The portable electronic device 380 may include one or more processors and one or more memories. The one or more processors can execute logic to communicate with the robot arm 100. The portable electronic device 380 may be configured with wired and/or wireless communication functionality for communicating with the robot arm 100. In some embodiments, the portable electronic device 380 may perform one or more elements of the functionality described herein, such as in embodiments in which the functionality described herein is distributed between the robot arm 100 and the portable electronic device 380.

The light 352, if provided, is coupled to the communication path 328 and communicatively coupled to the processor 330. The light 352 may be any device capable of outputting light, such as, but not limited to, a light emitting diode, an incandescent light, a fluorescent light, or the like. Some embodiments include a power indicator light that is illuminated when the robot arm 100 is powered on. Some embodiments include an activity indicator light that is illuminated when the robot arm 100 is active or processing data. Some embodiments include an illumination light for illuminating the environment in which the robot arm 100 is located. Some embodiments may not include the light 352.

The proximity sensor 354, if provided, is coupled to the communication path 328 and communicatively coupled to the processor 330. The proximity sensor 354 may be any device capable of outputting a proximity signal indicative of a proximity of the robot arm 100 to another object. In some embodiments, the proximity sensor 354 may include a laser scanner, a capacitive displacement sensor, a Doppler effect sensor, an eddy-current sensor, an ultrasonic sensor, a magnetic sensor, an internal sensor, a radar sensor, a LiDAR sensor, a sonar sensor, or the like. Some embodiments may not include the proximity sensor 354, such as embodiments in which the proximity of the robot arm 100 to an object is determined from inputs provided by other sensors (e.g., the camera 344, etc.) or embodiments that do not determine a proximity of the robot arm 100 to an object.

The robot arm 100 may be powered by the battery 360, which is electrically coupled to the various electrical components of the robot arm 100. The battery 360 may be any device capable of storing electric energy for later use by the robot arm 100. In some embodiments, the battery 360 is a rechargeable battery, such as a lithium-ion battery or a nickel-cadmium battery. In embodiments in which the battery 360 is a rechargeable battery, the robot arm 100 may include the charging port 362, which may be used to charge the battery 360. Some embodiments may not include the battery 360, such as embodiments in which the robot arm 100 is powered the electrical grid, by solar energy, or by energy harvested from the environment. Some embodiments may not include the charging port 362, such as embodiments in which the apparatus utilizes disposable batteries for power.

Figure 6:
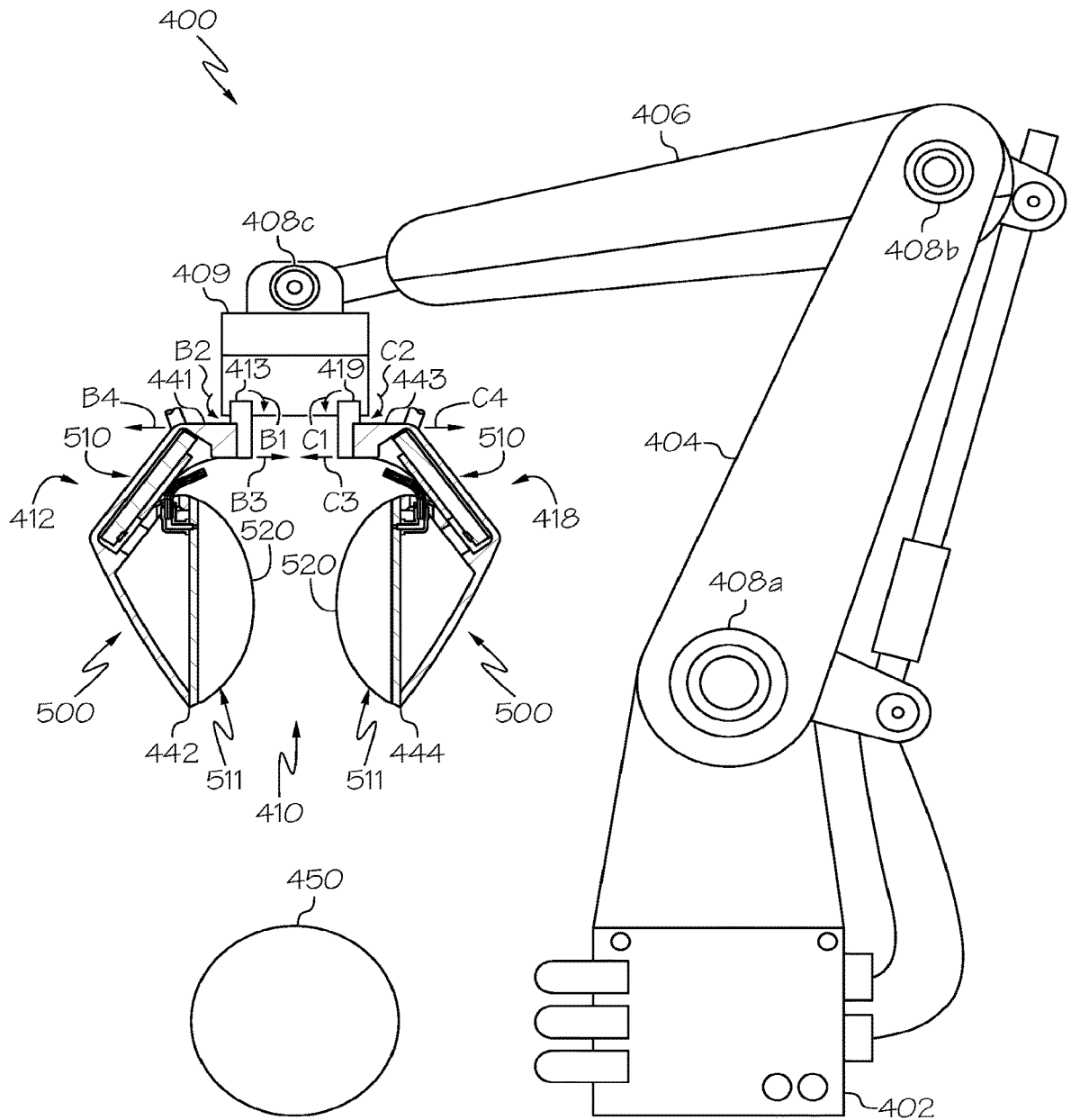
FIG. 6 schematically depicts an example robot arm including an end effector having a plurality of fingers and an example deformable sensor on each finger according to one or more embodiments described and illustrated herein.

Referring now to FIG. 6, there is depicted another example robot arm 400. The robot arm 400 may generally include a base 402 coupled to one or more arm segments, such as a first arm segment 404 and a second arm segment 406 via one or more joints 408a, 408b, 408c, and an end effector 410 including a first finger 412 and a second finger 418 for manipulating a target object 450. The first finger 412 and the second finger 418 of the end effector 410 of the robot arm 400 each includes an example deformable sensor 500. The deformable sensor 500 may be directly connected or coupled to a coupling member 409, as opposed to being provided between side members 114, 116 of the fingers 112, 118.

The first finger 412 may include a proximal end 441 and a distal end 442. In some embodiments, a grip mechanism 413 causes the first finger 412 to pivot with respect to the end effector 410 and the distal end 442 to move outwardly in the direction of arrow B1 away from the second finger 418 when the end effector 410 is moved toward the open position and inwardly in the direction of arrow B2 toward the second finger 418 when the end effector 410 is moved toward the closed position. In addition, the second finger 418 may include a proximal end 443 and a distal end 444. In some embodiments, a grip mechanism 419 causes the second finger 418 to pivot with respect to the end effector 410 and the distal end 444 to move outwardly in the direction of arrow C1 away from the first finger 412 when the end effector 410 is moved toward the open position and inwardly in the direction of arrow C2 toward the first finger 412 when the end effector 410 is moved toward the closed position. In this embodiment, the grip mechanisms 413, 419 may be any suitable translating member such as, for example, an actuator, rotary motor, or the like.

In some embodiments, the grip mechanism 413 of the first finger 412 and the grip mechanism 419 of the second finger 418 operate to linearly translate the first finger 412 and the second finger 418 relative to the end effector 410 instead of pivoting, as discussed above. As such, the grip mechanism 413 causes the first finger 412 to move inwardly in the direction of arrow B3 toward the second finger 418 when the end effector 410 is moved toward the closed position and outwardly in the direction of arrow B4 away from the second finger 418 when the end effector 410 is moved toward the open position. In addition, the grip mechanism 419 causes the second finger 418 to move inwardly in the direction of arrow C3 toward the first finger 412 when the end effector 410 is moved toward the closed position and outwardly in the direction of arrow C4 away from the first finger 412 when the end effector 410 is moved toward the open position. In this embodiment, the grip mechanisms 413, 419 may be any suitable translating member such as, for example, a linear actuator, a rack and pinion gear, or the like. The robot arm 400 may further include any combination of the components illustrated in FIG. 5 and operate in the manner discussed herein.

Figure 7:
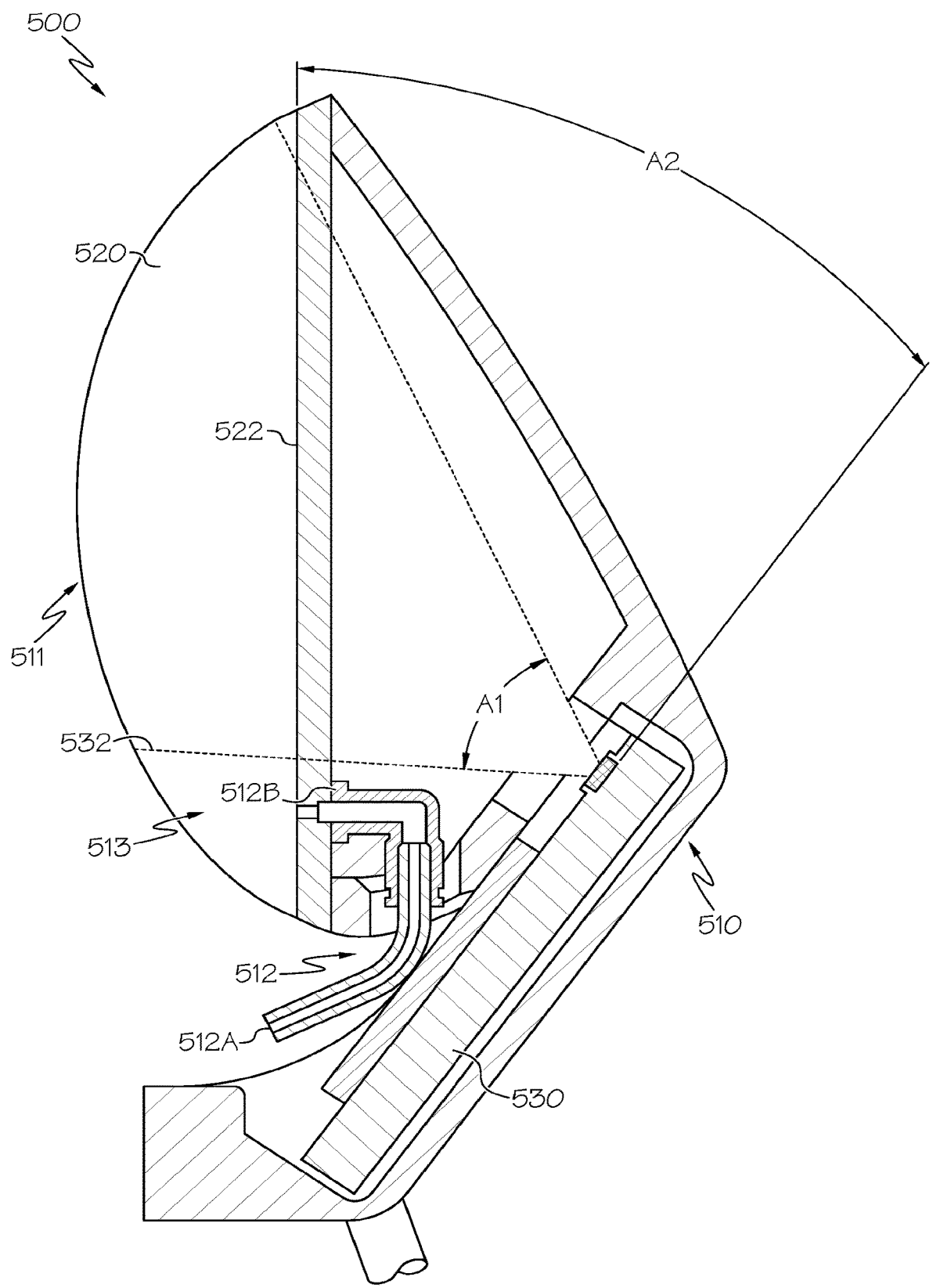
FIG. 7 schematically depicts a cross-sectional view of the example deformable sensor of the robot arm of FIG. 6 according to one or more embodiments described and illustrated herein.
Figure 8A:
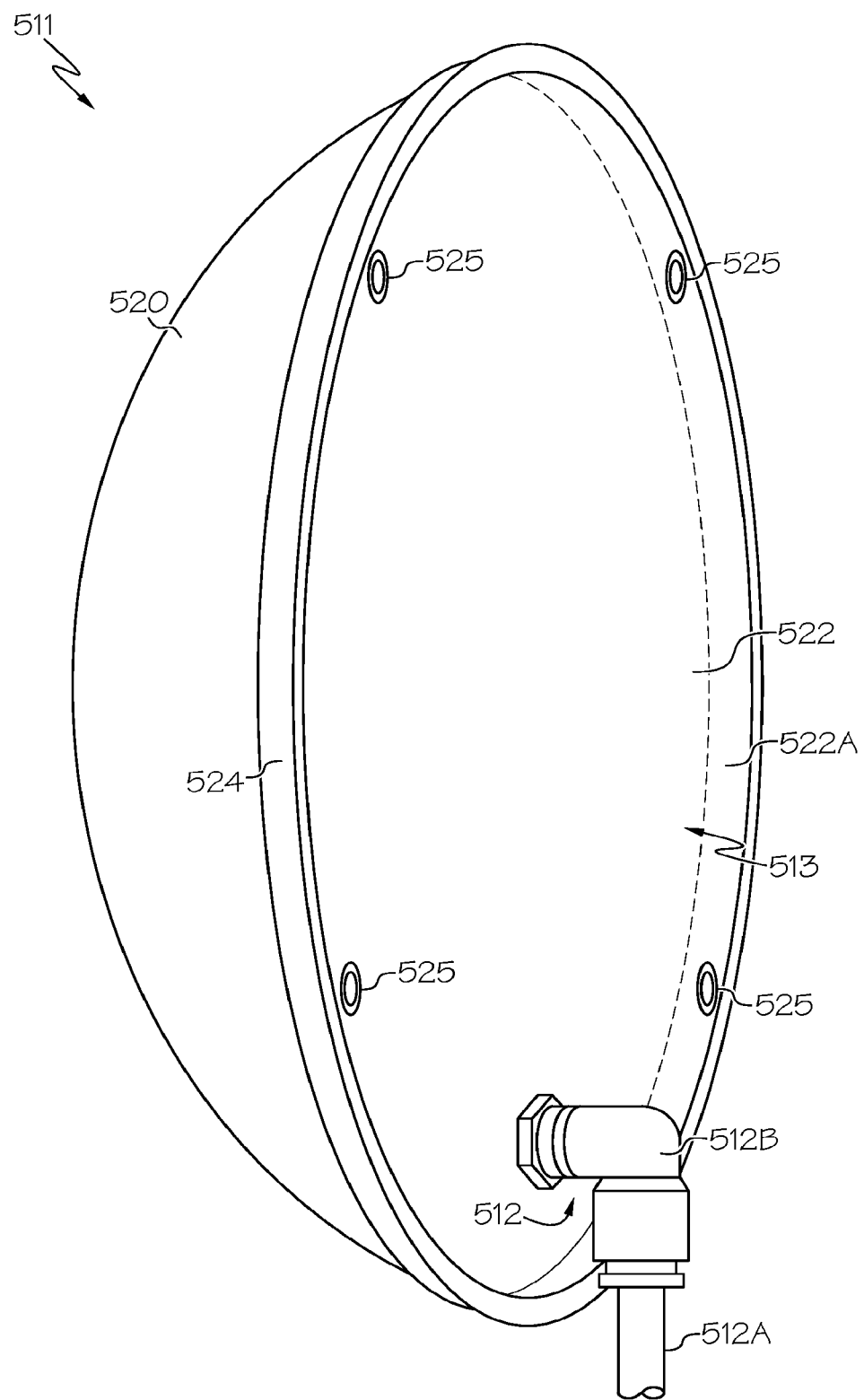
FIG. 8A schematically depicts a rear perspective view of a bubble module of the example deformable sensor of FIG. 7 according to one or more embodiments described and illustrated herein.
Figure 8B:
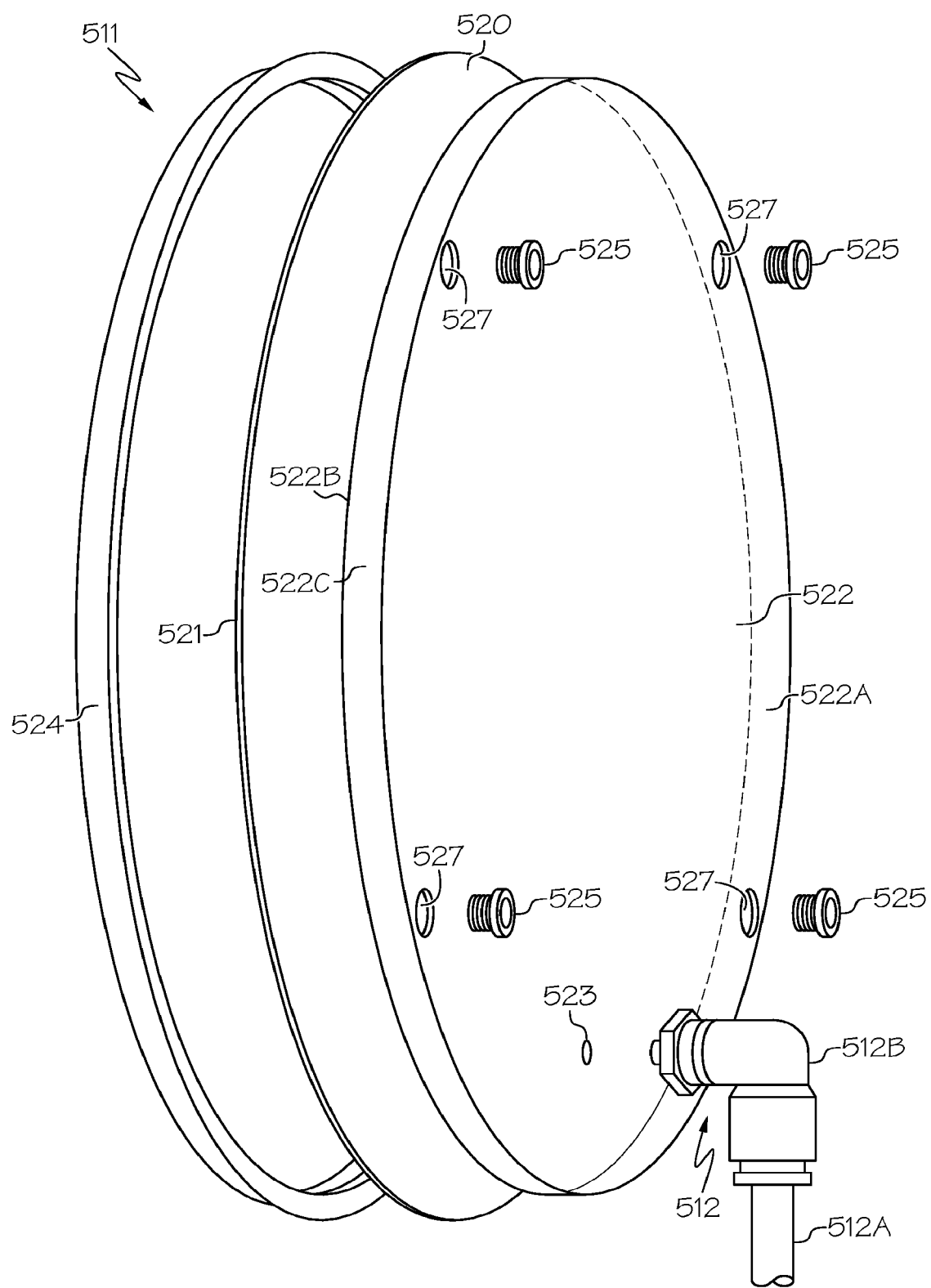
FIG. 8B schematically depicts an exploded view of the bubble sensor of FIG. 8A according to one or more embodiments described and illustrated herein.

Referring now to FIGS. 7, 8A, and 8B, the deformable sensor 500 is schematically illustrated. FIG. 7 is a cross-sectional view of the deformable sensor 500. The deformable sensor 500 is similar to the deformable sensor 200 and generally comprises a housing 510 and a bubble module 511 coupled to the housing 510. The bubble module 511 includes a deformable membrane 520, such as deformable membrane 220. The deformable membrane 520 may include any or all of the features disclosed herein with respect to the deformable membrane 220. The bubble module 511 is similar to the upper portion 211 of the deformable sensor 200, but easily removable from the housing 510 and, thus, replaceable when necessary. The bubble module 511 defines an enclosure 513 that is filled with a medium through one or more fluid conduits 512, which may be a valve or any other suitable mechanism, extending through the housing 510 and terminating at the bubble module 511. As shown, the fluid conduit 512 includes a tube 512A and a tube fitting 512B. The fluid conduit 512 may be utilized to fill or empty the enclosure 513. As the enclosure 513 is filled with the medium, the deformable membrane 520 forms a dome shape, as shown in FIG. 8.

An internal sensor 530, such as the internal sensor 230, capable of sensing depth may be disposed within the housing 510. The internal sensor 530 may have a field of view 532, having an angle A1, directed through the medium and toward an internal surface of the deformable membrane 520. As a non-limiting example, the angle A1 of the field of view 532 of the internal sensor 530 may be 62°×45°+/−10%. In some embodiments, the internal sensor 530 may be an optical sensor. As described in more detail below, the internal sensor 530 may be capable of detecting deflections of the deformable membrane 520 when the deformable membrane 520 comes into contact with an object, such as the target object 450. In one example, the internal sensor 530 is a time-of-flight sensor capable of measuring depth. The time-of-flight sensor emits an optical signal (e.g., an infrared signal) and has individual detectors (i.e., "pixels") that detect how long it takes for the reflected signal to return to the sensor.

As shown in FIG. 7, the internal sensor 530 is provided within the housing 510 and oriented at an angle A2 with respect to the bubble module 511, specifically the backing plate 522, such that the internal sensor 530 is not parallel to the backing plate 522. Specifically, the internal sensor 530 extends along an axis with the angle A2 extending between the axis of the internal sensor 530 and a backing plate 522 of the bubble module 511. As a non-limiting example, the angle A2 between the internal sensor 530 and the bubble module 511, i.e., the backing plate 522, may be 35°+/−10%. The internal sensor 530 being angled maximizes the field of view 532 and depth measurement accuracy at a center and distal edge of the deformable membrane 520 opposite the internal sensor 530, while minimizing an overall width dimension of the deformable sensor 500.

Referring now to FIGS. 8A and 8B, the bubble module 511 of the deformable sensor 500 is shown separate from the housing 510. As shown in FIG. 8A, the bubble module 511 is shown in its assembled form, while FIG. 8B illustrates an exploded view of the bubble module 511. The bubble module 511 includes the deformable membrane 520, the backing plate 522, and a ring 524 for securing the deformable membrane 520 onto the backing plate 522. The bubble module 511 may be removably coupled to the housing 510 using any suitable means, such as threaded inserts 525 extending through holes 527 in the backing plate 522 for securing the backing plate 522 to the housing 510. Alternatively, or in addition thereto, the threaded inserts 525 may be used to further secure an outer edge 521 of the deformable membrane 520 to the backing plate 522.

More particularly, the backing plate 522 includes a housing surface 522A, a membrane surface 522B, and an edge surface 522C extending between the housing surface 522A and the membrane surface 522B. The backing plate 522 is formed from a transparent material, such as an acrylic, so that the field of view 532 of the internal sensor 530 is not obstructed by the bubble module 511. In assembling the bubble module 511, an adhesive may be applied onto the edge surface 522C of the backing plate 522. Thereafter, the outer edge 521 of the deformable membrane 520 may be positioned around the backing plate 522 to contact the edge surface 522C thereof and be adhered thereto. Further, the ring 524 may be positioned around the edge surface 522C of the backing plate 522, thereby encircling the backing plate 522 to sandwich the deformable membrane 520 between the backing plate 522 and the ring 524. As noted above, the threaded inserts 525 may be used to further secure the deformable membrane 520 to the backing plate 522 by positioning the outer edge 521 of the deformable membrane 520 along the housing surface 522A of the backing plate 522 and inserting the threaded inserts 525 through the outer edge 521 of the deformable membrane 520 and the backing plate 522. As shown, the tube fitting 512B is shown attached to the backing plate 522 at an orifice 523 and the tube 512A extends from the tube fitting 512B to deliver a medium into the bubble module 511.

Thus, if the deformable sensor 500 is damaged, for example if the deformable membrane 520 punctured, such that medium leaks out of the bubble module 511, the deformable sensor 500 may be repaired without interfering with the housing 510 and electrical components provided therein, such as the internal sensor 530. In doing so, the bubble module 511 is removed from the housing 510 via the threaded inserts 525, or any other suitable means provided, and a replacement bubble module 511 may be coupled to the housing 510. Alternatively, it may be desirable to repair the existing bubble module 511 by replacing only the deformable membrane 520 or repairing the deformable membrane 520 itself by providing a patch to seal the puncture or other damaged area. It should appreciated that providing the deformable sensor 500 having the bubble module 511 that may be easily replaced allows for a greater portion of the deformable sensor 500 to be housed within the robot arm 400, while only the bubble module 511 is exposed and accessible from an exterior of the robot arm 400. This reduces the size of such a robot arm 400 and reduces the likelihood of damage to the deformable sensor 500 during operation.

Figure 9:
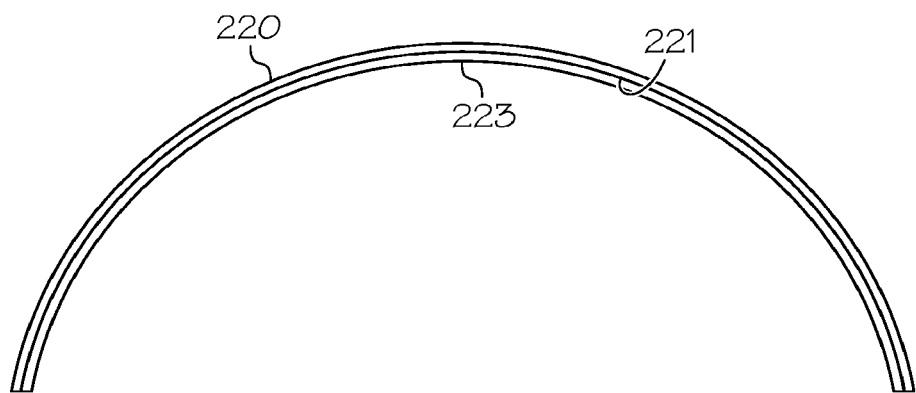
FIG. 9 schematically depicts a filter layer coupled to a deformable membrane of a deformable sensor according to one or more embodiments described and illustrated herein.

Referring now to FIG. 9, in some embodiments, the deformable sensors 200, 500 may include a filter layer 223. In a non-limiting example, the filter layer 223 is illustrated as being provided on the deformable sensor 200. The filter layer 223 may be disposed on an internal surface 221 of the deformable membrane 220. As described in more detail herein, the internal surface 221 of the deformable membrane 220 may be patterned (e.g., a dot pattern 225, a grid pattern 222, or any other suitable type pattern). By way of non-limiting example, a stereo-camera may be utilized to detect displacement of the deformable membrane 220 based on identified deformations of the patterned internal surface 221. The filter layer 223 may be configured to aid the internal sensor 230 in detecting deformation of the deformable membrane 220. In some embodiments, the filter layer 223 reduces glare or improper reflections of one or more optical signals emitted by the internal sensor 230. In some embodiments, the filter layer 223 may scatter one or more optical signals emitted by the internal sensor 230. The filter layer 223 may be an additional layer secured to the internal surface 221 of the deformable membrane 220, or it may be a coating and/or pattern applied to the internal surface 221 of the deformable membrane 220.

Figure 10:
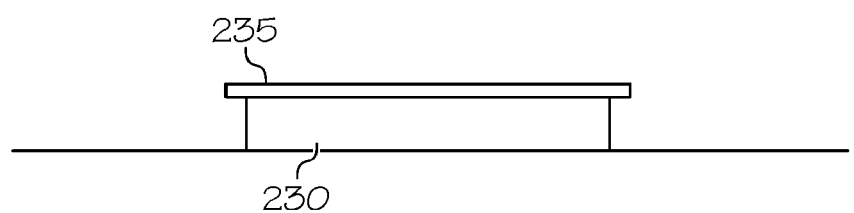
FIG. 10 schematically depicts a filter within a field of view of a sensor of a deformable sensor according to one or more embodiments described and illustrated herein.

Referring to FIG. 10, in some embodiments, the deformable sensors 200, 500 may include an internal sensor filter 235. In a non-limiting example, the internal sensor filter 235 is illustrated as being provided on the internal sensor 230 of the deformable sensor 200. The internal sensor filter 235 may be disposed within the field of view 232 of the internal sensor 230. The internal sensor filter 235 may optimize the optical signal emitted by the internal sensor 230 for reflection upon the internal surface 221 of the deformable membrane 220. Like the filter layer 223, the internal sensor filter 235 may be disposed within a field of view 232 of the internal sensor 230 and may reduce glare or improper reflections of any optical signals emitted by the internal sensor 230. In some embodiments, the internal sensor filter 235 may scatter one or more optical signals emitted by the internal sensor 230. In some embodiments, both the filter layer 223 and the internal sensor filter 235 may be utilized.

Figure 11A:
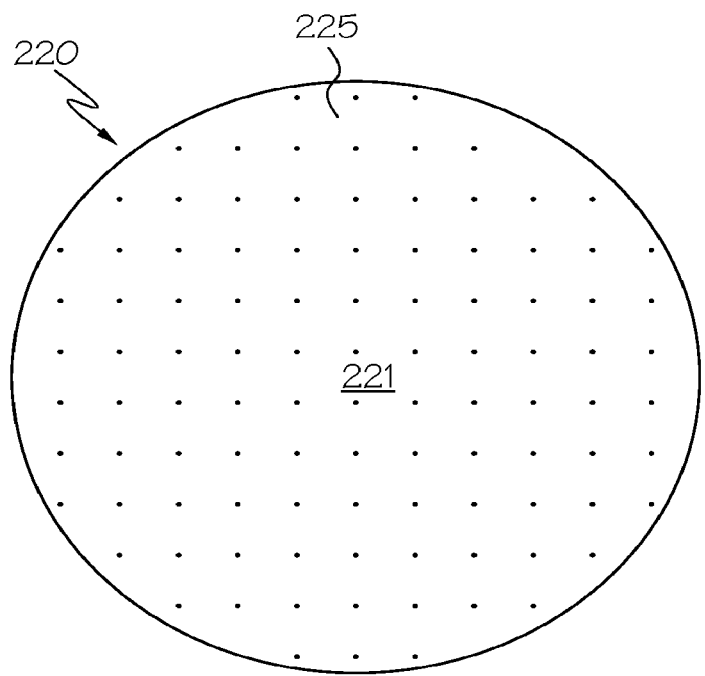
FIG. 11A schematically depicts a grid pattern on an internal surface of a deformable membrane of a deformable sensor according to one or more embodiments described and illustrated herein.

A pattern may be provided on either the internal surface 221 of the deformable membrane 220 of the deformable sensor 200 or the internal surface of the deformable membrane 520 of the deformable sensor 500. As shown in FIG. 11A, as a non-limiting example, a dot pattern 225 including a plurality of arranged dots may be applied to the internal surface 221 of the deformable membrane 220 on the filter layer 223 or the deformable membrane 220 itself to assist in the detection of the deformation of the deformable membrane 220. For example, the dot pattern 225 may assist in the detection of the deformation when the internal sensor 230 is a stereo-camera. Alternatively, a stereo-camera may be provided in addition to the internal sensor 230 to supplement the deformation detection of the internal sensor 230. Varying degrees of distortion to the dot pattern 225 may be utilized to discern how much deformation has occurred to the deformable membrane 220. The pattern on the internal surface 221 may be random and not necessarily arranged in a dot pattern 225 or an array as shown in FIG. 11A.

In some embodiments in which the dot pattern 225 is provided, an initial or pre-deformation image of the dot pattern 225 on the internal surface 221 of the deformable membrane 220 may be captured prior to any deformation of the deformable membrane 220. Thereafter, the internal sensor 230, or separate stereo-camera, if provided, captures at least one post-deformation image of the dot pattern 225 during or after deformation of the deformable membrane 220. The pre-deformation image may be compared to the post-deformation image and the location of each dot in the pre-deformation image is compared to corresponding dots in the post-deformation image to determine an amount of displacement of the dots and, thus, the displacement of the deformation membrane 220. The displacement of each dot may be used to determine the amount of deformation at individual quadrants or sections of the dot pattern 225. The amount of displacement of each dot is then converted into a distance measurement to determine the specific deformation of the deformable membrane 220, or sections thereof, to discern a geometry and/or pose of the object deforming the deformable membrane 220.

In some embodiments, measurements between each dot, or at least some of the dots, of the dot pattern 225 may be stored within a memory module, such as memory module 332 (FIG. 5) of the deformable sensor 200 or an associated processor, such as processor 330 (FIG. 5). Still referring to FIG. 11A, instead of merely determining a geometry and/or pose of the target object 150, the dimensions of various sections of the target object may be determined by calculating specific deformations between adjacent dots of the dot pattern 225. When the dot pattern 225 includes a greater number of dots, the dot pattern 225 may permit detection of deformation within smaller areas of the deformable membrane 220 as compared to when the dot pattern 225 includes a fewer number of dots. In embodiments in which the dots of the dot pattern 225 is arranged in an array, the dots may be equidistantly spaced apart from one another or arranged in any other suitable manner. However, in some embodiments, the distances between the dots when not equidistantly spaced from one another are stored within the memory module to identify the arrangement of the dots. In addition, it should be appreciated that the same technique discussed above of comparing the pre-deformation image to the post-deformation image may be repeated for a plurality of post-deformation images taken during deformation of the deformable membrane 220 to provide real-time data as to the geometry, measurements, and/or pose of the target object 150. By comparing post-deformation images to one another, displacement of the deformable membrane 220 occurring within smaller increments of time can be determined, as opposed to a total deformation of the deformable membrane 220 from an initial, pre-deformed state.

Figure 11B:
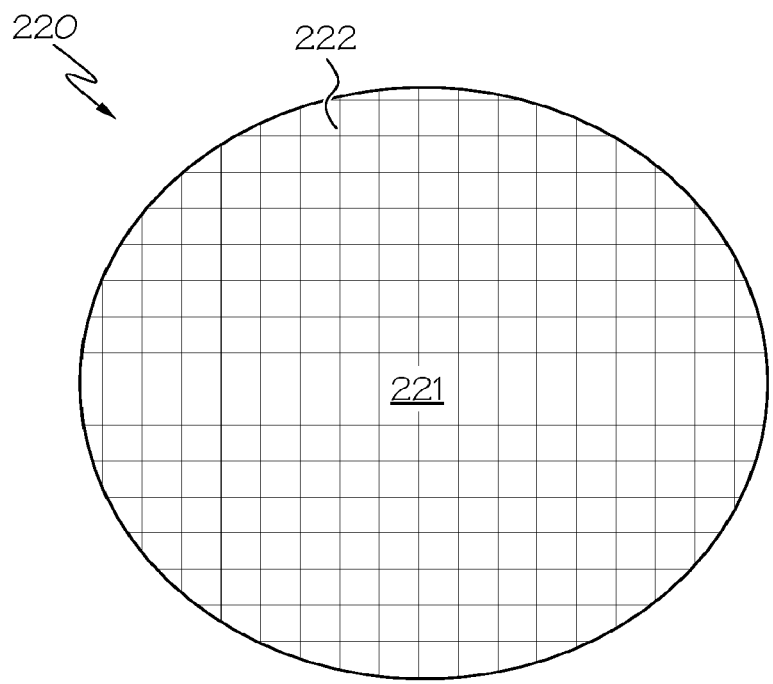
FIG. 11B schematically depicts a dot pattern on an internal surface of a deformable membrane of a deformable sensor according to one or more embodiments described and illustrated herein.

Referring to FIG. 11B, as a non-limiting example, a pattern may be a grid pattern 222 applied to the internal surface 221 of the deformable membrane 220 to assist in the detection of the deformation of the deformable membrane 220. For example, the grid pattern 222 may assist in the detection of the deformation when the internal sensor 230 is a stereo-camera. For example, varying degrees of distortion to the grid pattern 222 may be utilized to discern how much deformation has occurred. In this example, the distance between parallel lines and/or measuring curvature of lines in the grid pattern 222 may be used to determine the amount of deformation at each point in the grid pattern 222. The pattern on the internal surface 221 may be random and not necessarily arranged in a grid pattern 222 or an array as shown in FIG. 11B. It should be understood that embodiments are not limited to grid patterns and dot patters as discussed herein, as other types of patterns are possible, such as shapes and the like.

Figure 12:
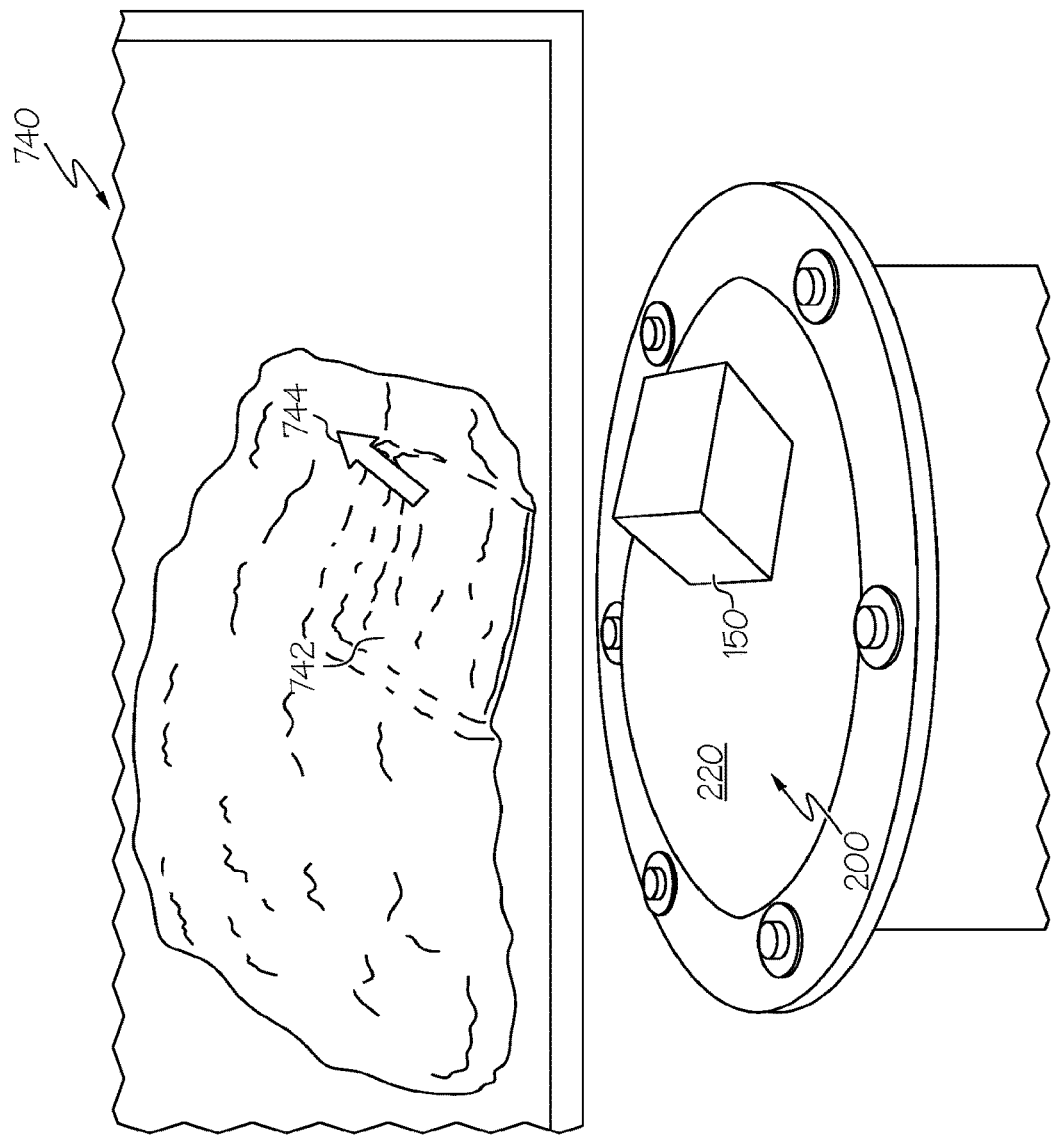
FIG. 12 schematically depicts an image depicting an output of a deformable sensor on an electronic display according to one or more embodiments described and illustrated herein.

FIG. 12 depicts an image of an example object, such as the target object 150, displacing the deformable membrane 220 of the example deformable sensor 200. It should be appreciated that the deformable sensor 500 may also be used in the same manner as discussed herein. In the illustrated embodiment, a display device 740 outputs for display on a device, output of the deformable sensor 200 in real time as the target object 150 contacts and/or deforms the deformable membrane 220. It should be understood that the display device 740 is provided for illustrative purposes only, and that embodiments may be utilized without the display device 740.

As the object 150 is pressed into the deformable membrane 220, the target object 150 imparts its shape into the deformable membrane 220 such that the deformable membrane 220 conforms to the shape of the target object 150. The spatial resolution of the internal sensor 230 may be such that the internal sensor 230 detects the geometry and/or pose of the displaced deformable membrane 220. For example, when the internal sensor 230 is a time-of-flight sensor, the optical signal that is reflected off of the internal surface 221 of the deformable membrane 220 that is being deflected by the target object 150 has a shorter time-of-flight than the optical signal that is reflected by the deformable membrane 220 at a region outside of the deflected region. Thus, a contact region 742 (or displaced region, used herein interchangeably) having a geometry and/or pose matching the shape of the target object 150 may be outputted and displayed on the display device 740.

The deformable sensor 200 therefore may not only detect the presence of contact with the target object 150, but also the geometry of the target object 150. In this manner, the robot arm 100 equipped with the deformable sensor 200 or the robot arm 400 equipped with the deformable sensor 500 may determine the geometry of the target object 150 based on contact therewith. Additionally, a geometry and/or pose of the target object 150 may also be determined based on the geometric information sensed by the deformable sensors 200, 500. For example, a vector 744 that is normal to a surface in the contact region 742 may be displayed, such as when determining the pose of the target object 150. The vector 744 may be used by the robot arm 100 or another device to determine which direction the target object 150 may be oriented, for example.

The display device 740 may be provided for displaying an output of the deformable sensor 200 in real time as the target object 150 contacts and/or deforms the deformable membrane 220. It should be appreciated that the display device 740 may be utilized with the robot arms 100, 400 illustrated in FIGS. 1 and 6, respectively. In a non-limiting example, the display device 740 may be provided for displaying in real time an output of the deformable sensor 200 on the first finger 112 and the deformable sensor 200 on the second finger 118. In doing so, when the robot arm 100 includes a pair of fingers, such as the first finger 112 and the second finger 118, an output may be displayed of the target object 150 collected from opposite or a plurality of sides of the target object 150. This allows for a more complete image of the target object 150 to be formed and to better determine the geometry and/or pose of the target object 150, as compared to when only a single deformable sensor 200 contacts the target object 150. In embodiments in which the robot arm 100 includes more than two spaced apart fingers, such as three fingers or four fingers and each finger including a deformable sensor 200, the resulting display of the combined output by each of the deformable sensors 200 provides an even more complete image of the geometry and/or pose of the target object 150.

Figure 13:
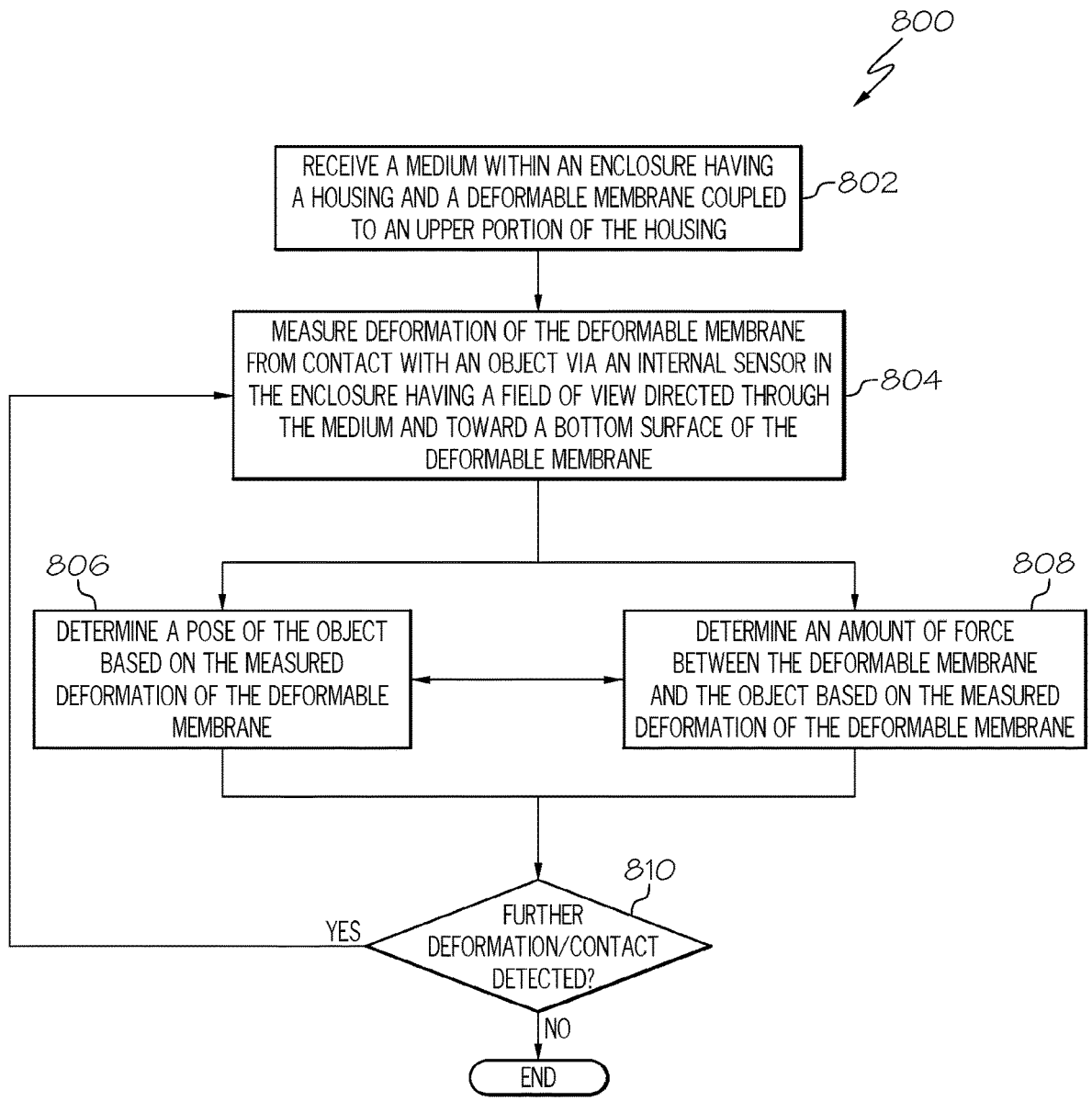
FIG. 13 is a flow chart depicting an exemplary process of determining the pose and force associated with an object in contact with a deformable sensor according to one or more embodiments described and illustrated herein.

Turning now to FIG. 13, a flowchart illustrates an exemplary method 800 for determining the pose and force associated with an object, such as the target object 150, in contact with the deformable sensors 200 of the robot arm 100 and the deformable sensors 500 of the robot arm 400. However, as discussed herein, reference is made to the robot arm 100 illustrated in FIGS. 1-5, which includes the deformable sensors 200, without limiting the scope of the present disclosure. At block 802, a medium (gas, liquid, silicone, etc.) is received within the enclosure 213 where the deformable membrane 220 is coupled to the upper portion 211 of the housing 210. At block 804, deformation of the deformable membrane 220 may be measured based on contact with the target object 150 via the internal sensor 230 in the enclosure 213 having a field of view 232 directed through the medium and toward the internal surface 221 of the deformable membrane 220. At block 806, a pose of the target object 150 may be determined based on the measure deformation of the deformable membrane 220, such as the contact region 742. As discussed above with reference to FIG. 13, a pose of the object 150 may be determined by the object 150 being pressed into the deformable membrane 220 and the deformable membrane 220 conforming to the shape of the target object 150. Thereafter, the internal sensor 230 detects the geometry and/or pose of the displaced deformable membrane 220. At block 808, an amount of force between the deformable membrane 220 and the target object 150 is determined based on the measured deformation of the deformable membrane 220. Blocks 806 and 808 may be performed simultaneously, but do not necessarily need to be. At block 810 a determination is made as to whether further deformation and/or contact is detected. If so, then the flowchart may return to block 804. If not, the flowchart may end.

It should now be understood that embodiments of the present disclosure are directed to robot arms including deformable sensors capable of detecting contact with a target object as well as determining a geometric shape and pose of the target object. The information provided by the deformable sensors may be used to control interaction of the robot arm with the target object. The depth resolution and spatial resolution of the deformation sensors may vary depending on the location of the deformable sensors on the robot.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot arm assembly for detecting a pose and a force associated with an object, the robot arm assembly comprising:
    a robot arm including an end effector;
    a deformable sensor provided on the end effector, the deformable sensor comprising:
        a housing; and
        a deformable membrane coupled to the housing;
    a processor communicatively coupled to the deformable sensor; and
    a memory module comprising a computer-readable medium storing computer-readable instructions that, when executed by the processor, cause the processor to:
        receive an output from the deformable sensor, the output comprising a contact region of the deformable membrane as a result of contact with the object;
        determine an amount of displacement of the contact region of the deformable membrane based on the output from the deformable sensor; and
        determine the pose and the force associated with the object based on the amount of displacement of the contact region of the deformable membrane.

2. The robot arm assembly of claim 1, wherein the robot arm includes at least two deformable sensors, the end effector is movable between an open position and a closed position in which a distance between the deformable sensors when the end effector in the closed position is less than a distance between the deformable sensors when the end effector is in the open position.

3. The robot arm assembly of claim 1, wherein the end effector has a plurality of fingers, each finger of the plurality of fingers includes an outwardly facing external side member and an opposite inwardly facing internal side member, wherein the deformable sensor is at least partially positioned within an associated finger between the external side member and the internal side member, the deformable membrane extends past the internal side member of an associated finger.

4. The robot arm assembly of claim 1, wherein the deformable sensor further comprises a bubble module removably attached to the housing, the bubble module including the deformable membrane and a backing plate defining an enclosure partially defined by the deformable membrane.

5. The robot arm assembly of claim 4, wherein an internal sensor is provided within the housing and the internal sensor is oriented non-parallel to the backing plate of the bubble module.

6. The robot arm assembly of claim 5, wherein the internal sensor is oriented at an angle of from 25° to 45° relative to the backing plate of the bubble module.

7. The robot arm assembly of claim 4, further comprising a fluid conduit extending through the housing and coupled to the backing plate for delivering a medium into the bubble module.

8. The robot arm assembly of claim 4, wherein the bubble module further comprises a ring configured to encircle the backing plate and secure the deformable membrane to the backing plate.

9. The robot arm assembly of claim 1, wherein the deformable sensor comprises an internal sensor comprising a filter disposed within a field of view of the internal sensor and configured to scatter an optical signal emitted by the internal sensor.

10. A method for sensor-based detection of an object, the method comprising:
    operating a robot arm including an end effector and a deformable sensor provided on the end effector, the deformable sensor comprising a housing and a deformable membrane coupled to the housing;
    receiving, by a processor, an output from the deformable sensor, the output comprising a contact region of the deformable membrane as a result of contact with the object;
    determining, by the processor, an amount of displacement of the contact region of the deformable membrane based on the output from the deformable sensor; and
    determining, by the processor, a pose and a force associated with the object based on the amount of displacement of the contact region of the deformable membrane.

11. The method of claim 10, further comprising delivering a medium into a bubble module of the deformable sensor defining an enclosure, the bubble module including the deformable membrane and a backing plate, the bubble module being removable from the housing of the deformable sensor.

12. The method of claim 11, further comprising filling the enclosure of the bubble module with the medium through a fluid conduit, the fluid conduit extending through the housing and coupled to the backing plate.

13. The method of claim 11, further comprising positioning an internal sensor within the housing such that the internal sensor is not parallel to the backing plate.

14. The method of claim 13, positioning the internal sensor at an angle of from 25° to 45° relative to the backing plate of the bubble module.

15. The method of claim 10, further comprising modifying deformability of the deformable sensor by changing a pressure within an enclosure of the deformable sensor.

16. The method of claim 10, further comprising analyzing, by the processor, the contact region by measuring changes in a dot pattern provided on a filter layer disposed on an internal surface of the deformable membrane.

17. A system for detecting a pose and a force associated with an object, comprising:
a robot arm including an end effector;
at least two deformable sensors provided on the end effector, each deformable sensor comprising:
a housing; and
a deformable membrane coupled to the housing,
wherein each deformable sensor is configured to detect a contact region of the deformable membrane as a result of contact with the object,
wherein the end effector is movable between an open position and a closed position in which a distance between the deformable sensors when the end effector in the closed position is less than a distance between the deformable sensors when the end effector is in the open position.

18. The system of claim 17, further comprising:
a processor communicatively coupled to the deformable sensors; and
a memory module comprising a computer-readable medium storing computer-readable instructions that, when executed by the processor, cause the processor to:
receive data from each deformable sensor representing a contact region within each deformable membrane as a result of the deformable membranes contacting the object;
determine an amount of displacement of contact region of the deformable membranes to determine the pose of the object; and
determine an amount of force applied between the deformable membrane of each deformable sensor and the object based on the amount of displacement of the contact region of the deformable membrane of each of the deformable sensors.

19. The system of claim 18, wherein the memory module includes computer-readable medium storing computer-readable instructions that, when executed by the processor, cause the processor to determine a vector normal to a surface of the object based on the data representing the contact region.

20. The system of claim 18, wherein the memory module includes computer-readable medium storing computer-readable instructions that, when executed by the processor, cause the processor to utilize a vector to determine which direction the object is oriented.

* * * * *

UNITED STATES PATENT AND TRADEMARK OFFICE
CERTIFICATE OF CORRECTION

| | |
|---|---|
| PATENT NO. | : 11,806,864 B2 |
| APPLICATION NO. | : 18/156113 |
| DATED | : November 7, 2023 |
| INVENTOR(S) | : Alexander Alspach et al. |

It is certified that error appears in the above-identified patent and that said Letters Patent is hereby corrected as shown below:

On the Title Page

Item (71), applicant 2, city, delete "Toyota" and insert --Toyota-shi, Aichi-ken--, therefor.

Item (72), inventor 8, city, delete "Nagakute" and insert --Nagakute-shi, Aichi-ken--, therefor.

Item (73), assignee 2, city, delete "Toyota" and insert --Toyota-shi, Aichi-ken--, therefor.

In the Specification

In Column 12, Line(s) 42, after "powered", insert --by--.

In Column 17, Line(s) 11, delete "patters" and insert --patterns--, therefor.

Signed and Sealed this
Eleventh Day of June, 2024

Katherine Kelly Vidal
*Director of the United States Patent and Trademark Office*